Nov. 11, 1969   J. D. FROST   3,477,072
ENERGY ABSORBING MATTRESS
Filed March 4, 1966
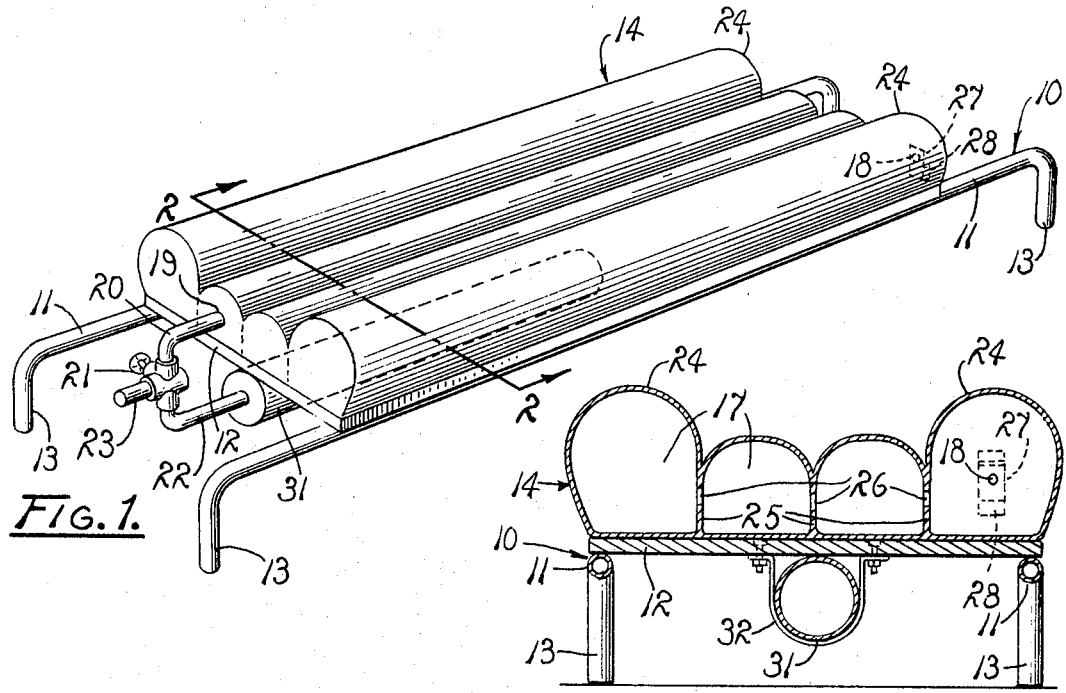
FIG.1.
FIG.2.
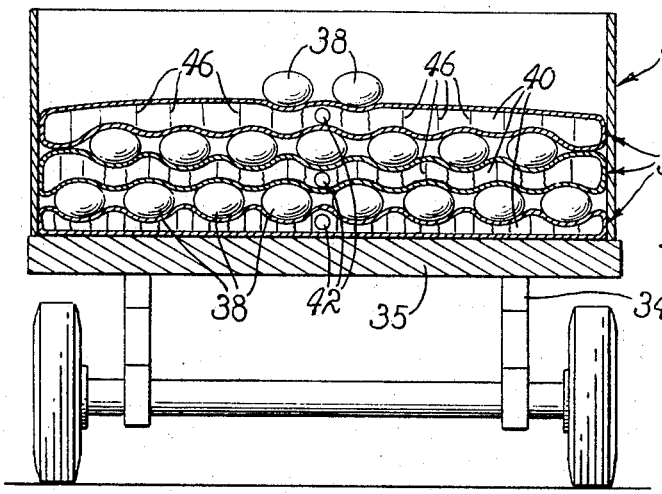
FIG.3.
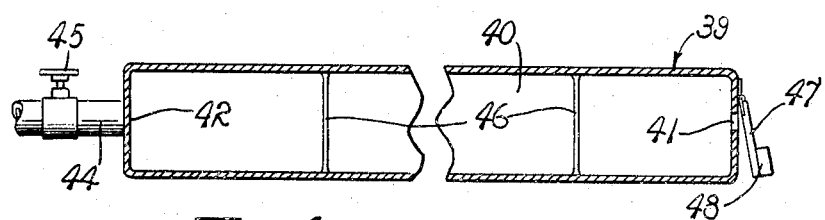
FIG.4.
JAMES D. FROST
INVENTOR
Huebner & Worrel
ATTORNEYS United States Patent Office 3,477,072
Patented Nov. 11, 1969

3,477,072
ENERGY ABSORBING MATTRESS
James Dahle Frost, Box 775, Porterville, Calif. 93257
Continuation-in-part of application Ser. No. 406,656,
Oct. 19, 1964. This application Mar. 4, 1966, Ser.
No. 531,925
Int. Cl. A47c 27/08
U.S. Cl. 5—348                                    5 Claims This application is a continuation-in-part of application Ser. No. 406,656, filed Oct. 19, 1964. The present invention relates to an energy absorbing mattress and more particularly to such a mattress which provides cushioned support and/or protection for fragile or otherwise easily damaged or discomforted burdens, such as a human body or an item of harvested agricultural produce supported by a vehicle, such as a truck, ambulance, litter, aircraft, or train, so as to absorb a substantial extent of the energy of the vehicle and object as relative movement occurs therebetween or as they experience energetic agitation.

Casualty rates during war time are often increased as a result of unsettling movements and forcible disturbances occurring during transportation of wounded personnel from the front lines to hospital areas. Such transportation is normally accomplished through use of litters, various types of wheeled vehicles, and extremely vibratory aircraft such as helicopters. In transporting wounded personnel in such vehicles, there is susbtantial likelihood of additional injuries being caused or of aggravation of existing injuries and wounds as a result of shock, compounding of fractures, loosening of bandages and stitches to allow increased bleeding, and general agitation and discomfort, all of which often lead to increased mortality rates, shock, or at least cause longer periods of convalescence. A principal reason for such occurrences is that previously there has been no way gently to accommodate the inertia of a wounded person reclining in such a vehicle or to prevent jarring disturbance of the person in response to agitation, vibration or sudden energetic movements of the vehicle relative to the person. As a result, the force or energy of each jolt, tremor or bounce of a conventional litter being carried over rough terrain, or of a helicopter or other light aircraft even in fair weather, or of a wheeled vehicle on unimproved roads or rough terrain, is imparted directly to the wounded person to his great discomfort and pain.

Somewhat similar problems exist in the case of transporting items of newly harvested agricultural produce, such as various types of fruit and vegetables. Previously, in transporting watermelons, the melons have been stacked in layers on a truck bed and cushioned by means of hay or straw matting disposed on the truck bed and between each layer. This practice entails a substantial fire hazard due to the combustible nature of hay and straw. Also, such matting has proven quite expensive, since it is not adapted conveniently to be used for consecutive loads but must be continually replenished. Furthermore, hay or straw matting has not proven entirely successful, since it is not sufficiently soft to cushion the melons adequately against concussion or bruising unless used in excessive quantites.

Previous experiments with conventional mattresses have not proven successful for such purposes. Such mattresses are too cumbersome for convenient or efficient use. They are not sufficiently soft to absorb an adequate amount of the energy of agitation or relative movement to be effective in protecting transported personnel or other objects from shock or concussion caused by jolting, bumping, vibration, or other sudden movements or agitation of the transport vehicle. Further, some mattresses are too resilient and return an appreciable amount of the energy of agitation or relative movement so as to defeat their purpose. For example, the use of contemporary types of inflated pneumatic mattresses for moderating the intensity of agitation or relative movement do not insure adequate absorption of the kinetic energy or force normally generated by a moving vehicle and its occupant or cargo, with the result that such mattresses tend to bounce such objects and cause them increased agitation.

Accordingly, it is an object of the present invention to provide an improved energy absorbing mattress.

Another object is to provide an energy absorbing mattress adapted to support and cushion an object for transport on a vehicle so as gently to accommodate the inertia of the object during agitation and sudden movement by the vehicle and to absorb the energy or force generated by the vehicle and object during such agitation and relative movement.

Another object is to provide such a mattress which is usable on any type of vehicle, such as a litter or stretcher, truck, passenger vehicle, train, or aircraft.

Another object is to provide such a mattress adapted to absorb the energy of agitation or of movement of any type of object, such as a human being or an item of harvested agricultural produce.

Another object is to provide such a mattress of a pneumatic type wherein the quantity of air is automatically regulated so as to absorb the force and energy of relative movement or agitation, by air displacement.

Another object is to provide such a mattress which minimizes shock, concussion, contusion or other injuries or damage previously suffered by transported objects as a result of jolting, bumping, agitation, or other sudden movements of a transport vehicle.

Another object is to provide such a mattress which is adapted to provide stability for objects transported thereon and to prevent their dislodgment therefrom.

Another object is to provide such a mattress which minimizes or obviates bouncing or increased agitation.

Another object is to provide such a mattress which is of simple, lightweight, and durable construction, and adapted to be manufactured at low cost.

Another object is to provide such a mattress which can be compactly stored and transported when not in use.

These and other objects and advantages of the present invention will become more clearly apparent upon reference to the following description and accompanying drawing.

In the drawing:

FIG. 1 is an isometric view of an energy absorbing mattress of the present invention in a litter embodiment.

FIG. 2 is an enlarged transverse vertical section of the mattress of FIG. 1 taken in a plane represented by line 2—2 of FIG. 1.

FIG. 3 is a transverse vertical section of a wheeled vehicle containing a second form of energy absorbing mattress of the present invention.

FIG. 4 is an enlarged fragmentary longitudinal section of the energy absorbing mattress of FIG. 3.

First form

Referring more particularly to the drawing, a litter or stretcher is illustrated as a frame 10 having longitudinal members 11 and a transverse member of platform 12. The longitudinal members are angled downwardly at their respective ends to form posts 13 for support of the litter on a ground surface or the like.

A flexible membrane or envelope 14 representing a first form of the present invention is preferably secured to the frame and provides an air receiving chamber 17, the envelope forming a mattress or cushion when inflated. The envelope is formed of any siutable elastomeric or substantially fluid-tight material, such as sheet plastic or rubber. The envelope is provided with a constricted orifice or outlet 18, and an inlet 19 connected to a supply duct 20 leading preferably to a suitable two-way valve 21. The valve is preferably of an adjustable type adapted to allow selective regulation of air flow. The valve is equipped with a pair of inlet conduits 23 and 24 respectively. The envelope is preferably corrugated to achieve maximum strength and resiliency and has enlarged or thickened side portions 25 for restraining a patient, not shown, upon the mattress. The envelope is partitioned interiorly of the chamber by means of walls 25 which serve to maintain the general shape and configuration of the inflated mattress under the weight of a patient regardless of the location of the patient on the mattress. The walls have openings 26 therein of sufficient diameter to accommodate the free flow of air within the chamber.

A flap 27 is preferably hingedly connected across the outlet 18 and is adapted to swing outwardly from the outlet to accommodate increased discharge of air therethrough. A weight 28 of predetermined magnitude may be provided on the flap so as gravitationally to urge it toward the outlet and thereby to impede air discharged therethrough to a predetermined rate proportionate to the rate of supply.

The conduit 22 leads from the valve 21 to a suitable air supply unit such as a portable compressed air cartridge or cylinder 31 preferably adapted to be carried on the frame 10. The cylinder is secured to the frame in any suitable manner such as by means of U-shaped brackets 32 bolted to the platform 12. The cylinder may be of any suitable type adapted to provide a predetermined supply of air to the chamber 17 sufficient during movement of the litter gently to accommodate the inertia of a disabled person, not shown, being transported on the litter and to absorb the energy of agitation or movement. The bolted connection of the cylinder to the frame should be such as to allow convenient loosening thereof for replacement of the cylinder when empty. It is also possible to utilize other means of transport for the air supply unit, such as by carrying on the back of one of the litter bearers, not shown. Further, a source of compressed fluid other than air may be utilized, such as a cylinder of carbon dioxide under pressure.

It should be appreciated that the mounting of the mattress or envelope 13 of the first form of the present invention as shown in FIG. 1 is merely an example of various possible uses of such a mattress on a transport vehicle. It is also possible to mount the mattress on a hand cart, push cart, wheelbarrow or the like for transporting various types of objects. Furthermore, the mattress of the first form may be utilized for transporting persons who have become disabled in other than military situations.

The frame 10 with the associated mattress or envelope 14 is adapted to be positioned on a vehicle, such as an ambulance or an aircraft. For this purpose, the conduit 23 leading from the valve 21 is connected to a compressed air supply system, not shown, associated with such vehicle or to an air compressor, not shown, mounted on the vehicle. Such a system is adapted to provide air under pressure to the mattress for longer periods of transportation than is otherwise possible through use of contemporary types of portable compressed air cylinders.

Operation of first form

The operation of the first form of the present invention is believed to be readily apparent and is briefly summarized at this point. Assuming that a disabled person, not shown, is ready to be transported from a front line position to a rear echelon area for medical treatment, the cylinder 31 is actviated to supply air under pressure to the chamber 17 so as to distend the mattress or envelope 14 until it has been inflated to the desired pressure, at which time the air commences to exhaust through the outlet 18 at a predetermined rate controlled by the gravitational bias of the flap 27. The flap acts as a control for the outlet, which functions as a continuously discharging relief valve. The litter is then positioned next to the disabled person and, by use of techniques well known in the art of first aid, he is placed on the mattress in a prone position. The mattress is maintained in an inflated condition while the injured person is being transported to a motor vehicle or directly to a hospital area. The inflating pressure maintained is only a slight positive pressure, a few pounds per square inch above ambient pressures being adequate for the purpose.

While the injured person is being carried cross country, the frame 10 is subjected to numerous jolts, bumps, and the like, as the litter bearers negotiate the rough and uneven terrain normally encountered in battle areas. When conventional litters are utilized, such irregular movements tend to be imparted directly to the patient thus subjecting him to forcible disturbance and energetic agitation likely to cause discomfort and pain. Use of the mattress or envelope 14, however, substantially minimize such convulsive and unsettling disturbances. As the litter with the disabled person thereon is subjected to jolts, agitation, and other energetic movements, the mattress accommodates the inertia of the person's body through gentle instantaneous compression of the envelope and increased rate of exhaust through the outlet. The agitational or kinetic energy developed by the person in reaction to such movements is also gently accommodated by the envelope and causes air to be forcefully discharged through the outlet 18 so that the internal pressure in the chamber 17 is not substantially raised and there is virtually no bounce or energy return. When the agitation of the litter is pronounced, the expelling air forces the flap 27 outwardly so that the outlet can accommodate large volume release of air if necessary. The result is that the envelope absorbs a substantial amount of the agitational or kinetic energy of both the litter and the disabled person's body and thereby protects the person from sudden jolting movements while at the same time causing a dampening or moderating effect as a result of the discharge of air at a limited rate through the outlet 18. This dampening effect allows the cushioning of the disabled person from shocking jolts while preventing the mattress from resiliently bouncing the disabled person and thereby intensifying the agitational movement of his body.

During transport of the litter and its passenger and especially after pronounced agitation or forcible disturbance thereof, the air within the chamber 17 is continuously replenished by the cylinder 31 so as to maintain the required pressure of inflation and to recondition the envelope 14 for subsequent jolts if necessary. Such prompt inflation is facilitated by the return of the flap 27 under the urging of the weight 28. It is to be noted that even with the flap closed, there nevertheless is a continuous discharge of air through the outlet 18 so that upon further agitation, the release of excess air due to pressure exerted on the envelope is immediately initiated and does not require flap movement to commence.

For transport of the disabled person on a powered vehicle such as a wheeled passenger vehicle, helicopter or other light aircraft, the litter and its passenger are placed on the vehicle and the conduit 23 is connected to a suitable source of compressed air, not shown, located on the powered vehicle itself. The litter may be strapped to the vehicle for increased stability if desired. During travel of the powered vehicle, the mattress or envelope 14 supports the disabled person and protects him from increased injury or discomfort in a manner substantially similar to that described above for its operation during transport by manual power.

Second form

A second form of energy absorbing mattress of the present invention is shown generally in FIGS. 3 and 4. A motor vehicle, such as a truck 33, is schematically illustrated as including a frame 34 supporting a cargo bed 35 having a quantity of watermelons 38 loaded thereon in layers.

A flexible membrane or envelope 39 is disposed beneath each layer of melons for cushioning of the melons supported thereon. Each envelope provides an air receiving chamber 40 and has a constricted orifice or outlet 41, and an inlet 42 connected to an air supply conduit 44. The conduit leads through a valve 45 preferably to a suitable source of air under pressure, such as a blower or air compressor, not shown, mounted on the vehicle. The valve is preferably of an adjustable type adapted to allow selective regulation of the flow of air. The envelope is formed of a material similar to that of the first form and includes a plurality of ligaments 46 adapted to maintain the inflated envelope in a predetermined uniform configuration regardless of the weight or distribution of melons disposed thereon.

A flap 47 is preferably hingedly connected across the outlet 41 and a weight 48 of selected magnitude may be provided on the flap so as gravitationally to urge it toward the outlet. The disposition and function of the flap and its weight are substantially similar to that described above for the flap 27 and weight 28 of the first form. For convenience of illustration, the flap is shown in FIG. 4 as being oriented for swinging movement rearwardly of the truck 33. The outlet and flap may also be disposed at the front of the mattress and, in fact, such disposition is often preferable. When so employed, the weight is disposed so that upon sudden stopping of the truck in a manner likely to dislodge the melons 38, the momentum of the weight tends to move the flap outwardly of the outlet to accommodate increased air discharge therethrough. This tends gently to settle the melons and prevent their being scattered and damaged.

Operation of second form

For transport of a quantity of watermelons 38, a mattress or envelope 39 is positioned on the truck bed 25 and the air supply is activated so as to inflate the mattress to the desired positive pressure, a few pounds per square inch above ambient pressures likewise being adequate for this purpose. The mattress and its outlet 41 thereupon commence to function in a manner similar to that described for the envelope or mattress 14 of the first form. Melons are then loaded onto the mattress so as to provide as uniform a distribution as possible for efficiency of loading. After the first layer of melons has been loaded, a second mattress 39 is placed on top of the first layer and inflated as described above for the bottom mattress. A second layer of melons is then loaded onto the second mattress. This operation is repeated successively until all of the melons are loaded on the truck in layers with respective envelopes or mattresses sandwiched therebetween. If one layer is incomplete, such as the top layer shown in FIG. 3, the inflated mattress immediately therebeneath nevertheless maintains its substantially flat configuration as a result of the reinforcement provided by the ligaments 46.

The truck 33 is then driven to the desired location for unloading the melons 38. During transport, the truck experiences vibrations, jolts, forcible agitation, and other irregular movements and tends to impart the force or energy of such movement to loads borne thereby. However, as with the first form, the mattresses 39 gently accommodate the inertia of the watermelons upon such irregular movements of the truck and absorb a substantial extent of the energy of agitation and relative movement experienced by the watermelons and the truck effectively to minimize such movement and to dampen or moderate any forcible and unsettling disturbances otherwise likely to be caused thereby. Each mattress provides cushioned protection for the melons disposed immediately therebeneath as well as providing cushioned support for the melons disposed thereupon. The discharge of air through the outlets 41, the maintenance of the required positive pressure in the chambers 40, and the action of the weighted flaps 47 all occur substantially as described above for the first form. As a result, the watermelons are maintained in a settled and stable position during transport and damage is thereby avoided.

At the unloading point, each layer of melons 38 is successively unloaded and the truck bed 35 prepared for a new load. By adjusting the valves 45 to increase the supply of air, it is possible to inflate the envelopes 39 to an increased volume or bulk so that the melons are caused to roll from their respective mattresses for more expeditious and efficient unloading than when unloading entirely by hand.

For compact storage or transport, the mattresses are simply deflated and rolled, folded or stacked as best suits the available space.

From the foregoing, it is readily apparent that an energy absorbing mattress has been provided which is adapted for transport of objects on a moving vehicle so as to absorb a substantial amount of the energy of agitation or relative movement experienced by the objects and the vehicle. The mattress is usable with any type of vehicle and may absorb the agitational energy of human passengers as well as that of cargo such as harvested agricultural produce. It affords substantial protection for passengers or cargoes from injury or damage by cushioning them from bumps, jolts, vibration, and other irregular movements, as well as by dampening or moderating any reflex action tending to cause intensified agitation.

Although the invention has been herein shown and described in what are conceived to be the most practical and preferred embodiments, it is recognized that departures may be made therefrom within the scope of the invention.

Having described my invention, what I claim as new and desire to secure by Letters Patent is:

1. An energy absorbing pneumatic mattress for supporting an object having weight and inertia, said mattress and object respectively being susceptible of energetic agitation and relative movement therebetween, comprising a flexible pneumatic envelope having a constricted outlet, and means connected to the envelope for continuously supplying fluid to the envelope at a rate sufficient to maintain a positive pressure therein to distend the same, said positive pressure and volume of the envelope being sufficient in relation to the size of the outlet upon agitation gently to accommodate the inertia of the object and to absorb the energy of agitation and relative movement of the object and mattress short of complete collapse of the envelope and sufficient again to distend the envelope under the weight of such an object all while continuously discharging fluid through the outlet.

2. The mattress of claim 1 including a flap pendantly mounted in covering relation to the outlet to accommodate increased discharge of fluid therethrough and being gravitationally urged toward the outlet to obstruct fluid discharged therethrough to expedite distention of the envelope.

3. In combination with a vehicle for transporting an object having weight and inertia, said vehicle and object respectively being susceptible of agitation and relative movement therebetween and during such agitation and movement having energy of determinable ranges, an energy absorbing pneumatic mattress disposed on the vehicle for supporting the object thereon during transport comprising a flexible pneumatic envelope having a constricted outlet, and means connected to the envelope for continuously supplying fluid to the envelope at a rate sufficient to maintain a positive pressure therein to distend the same to a predetermined volume, said positive pressure and volume of the envelope being sufficient in relation to the size of the outlet during agitation and relative movement gently to accommodate the inertia of the object and to absorb the energy of agitation and relative movement of the object and vehicle short of complete collapse of the envelope and sufficient again to distend the envelope under the weight of such an object all while continuously discharging fluid through the outlet.

4. The combination of claim 3 wherein the vehicle comprises a litter and the object is a human body, said litter being adapted to support the body for transport selectively by manual and powered means respectively.

5. A device for transporting fragile or otherwise easily damaged or discomforted loads comprising
(A) a portable frame,
(B) a flexible pneumatic envelope having a constricted outlet mounted on the frame and disposed to receive a load thereon,
(C) and means mounted on the frame connected to the envelope for substantially continuously supplying gas under pressure to the envelope for substantially continuous discharge therefrom through the outlet, the gas being supplied to the envelope at a rate sufficient to maintain a positive pressure therein to distend the same.

References Cited

UNITED STATES PATENTS

| | | | |
|---|---|---|---|
| 2,682,670 | 7/1954 | Crump | 5—348 XR |
| 2,751,610 | 6/1956 | Griswold | 5—348 |
| 3,310,818 | 3/1967 | Fischer | 5—348 |

BOBBY R. GAY, Primary Examiner

ANDREW M. CALVERT, Assistant Examiner

U.S. Cl. X.R.

56—329